(12) United States Patent
Khan et al.

(10) Patent No.: US 10,338,959 B2
(45) Date of Patent: Jul. 2, 2019

(54) TASK STATE TRACKING IN SYSTEMS AND SERVICES

(71) Applicant: Microsoft Technology Licensing, LLC, Redmond, WA (US)

(72) Inventors: Omar Zia Khan, Bellevue, WA (US); Paul Anthony Crook, Bellevue, WA (US); Marius Alexandru Marin, Seattle, WA (US); Ruhi Sarikaya, Redmond, WA (US); Jean-Philippe Robichaud, Mercier (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/797,444

(22) Filed: Jul. 13, 2015

(65) Prior Publication Data

US 2017/0017519 A1 Jan. 19, 2017

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/4843* (2013.01); *G06F 9/5083* (2013.01); *H04L 51/02* (2013.01); *H04L 51/32* (2013.01)

(58) Field of Classification Search
CPC .... G06F 9/4843; G06F 9/4881; G06F 9/5083; H04L 51/02; H04L 51/32
See application file for complete search history.

(56) References Cited

U.S. PATENT DOCUMENTS

| 6,311,159 B1 | 10/2001 | Van Tichelen et al. |
| 6,526,382 B1 | 2/2003 | Yuschik |

(Continued)

FOREIGN PATENT DOCUMENTS

| GB | 2407682 | 5/2005 |
| WO | 2001067241 A1 | 9/2001 |

(Continued)

OTHER PUBLICATIONS

Williams, Jason D., "The Best of Both Worlds: Unifying Conventional Dialog Systems and POMDPs", In Proceedings of 9th Annual Conference of the International Speech Communication Association, Sep. 22, 2008, 4 pages.
(Continued)

*Primary Examiner* — James J Lee
*Assistant Examiner* — Willy W Huaracha

(57) ABSTRACT

Non-limiting examples of the present disclosure describe decoupling task state tracking that is managed by a shared task completion platform from execution of tasks by a task resource owner. Task registration data is received at a shared task state platform for a task that is executable by a task owner resource. Task registration data comprises parameters to be collected for execution of the task and ancillary information, such as the name of the task and whether to confirm the values of the parameters after collection. During interaction with a user, the shared task completion platform receives an input and determines the task is associated with the received input. During the interaction, parameters of the received task registration data are utilized to collect data for execution of the task. The collected data is transmitted to the task owner resource for execution of the task.

20 Claims, 9 Drawing Sheets

(51) Int. Cl.
*G06F 9/50* (2006.01)
*H04L 12/58* (2006.01)

(56) References Cited

U.S. PATENT DOCUMENTS

| | | | |
|---|---|---|---|
| 6,604,075 | B1 | 8/2003 | Brown et al. |
| 6,839,896 | B2 | 1/2005 | Coffman et al. |
| 7,024,348 | B1 | 4/2006 | Scholz et al. |
| 7,257,537 | B2 | 8/2007 | Ross et al. |
| 7,434,162 | B2 | 10/2008 | Gorelov et al. |
| 7,441,250 | B2 * | 10/2008 | Katz ................ G06F 9/45512 718/100 |
| 7,461,344 | B2 | 12/2008 | Young et al. |
| 7,487,440 | B2 | 2/2009 | Gergic et al. |
| 7,546,382 | B2 | 6/2009 | Healey et al. |
| 7,571,392 | B2 | 8/2009 | Cortesi |
| 7,853,453 | B2 | 12/2010 | Potter |
| 7,983,997 | B2 | 7/2011 | Allen et al. |
| 8,001,469 | B2 | 8/2011 | Weng et al. |
| 8,073,681 | B2 | 12/2011 | Baldwin et al. |
| 8,572,209 | B2 | 10/2013 | Healey et al. |
| 8,767,947 | B1 | 7/2014 | Ristock et al. |
| 8,799,000 | B2 | 8/2014 | Guzzoni et al. |
| 8,949,132 | B2 | 2/2015 | Bangalore et al. |
| 9,082,406 | B2 | 7/2015 | Shen et al. |
| 2001/0011366 | A1 | 8/2001 | Beck et al. |
| 2003/0225825 | A1 | 12/2003 | Healey et al. |
| 2006/0173689 | A1 | 8/2006 | Hataoka et al. |
| 2007/0156407 | A1 | 7/2007 | Schedl |
| 2007/0203869 | A1 * | 8/2007 | Ramsey ................ G06F 17/279 706/52 |
| 2007/0250841 | A1 | 10/2007 | Scahill et al. |
| 2008/0010069 | A1 * | 1/2008 | Katariya ................ G06F 9/451 704/257 |
| 2008/0059605 | A1 | 3/2008 | Shalev et al. |
| 2008/0184241 | A1 * | 7/2008 | Headrick ............. G06F 9/4843 718/102 |
| 2008/0319748 | A1 | 12/2008 | Nakano et al. |
| 2010/0049879 | A1 | 2/2010 | Leavitt et al. |
| 2010/0098224 | A1 | 4/2010 | Bangalore et al. |
| 2011/0016421 | A1 | 1/2011 | Krupka et al. |
| 2011/0161958 | A1 * | 6/2011 | Xu ........................ G06Q 10/06 718/100 |
| 2012/0016678 | A1 | 1/2012 | Gruber et al. |
| 2012/0253788 | A1 | 10/2012 | Heck et al. |
| 2013/0111487 | A1 * | 5/2013 | Cheyer ............... G06F 17/3087 718/102 |
| 2013/0152092 | A1 * | 6/2013 | Yadgar ................ H04M 3/4936 718/102 |
| 2013/0275164 | A1 | 10/2013 | Gruber et al. |
| 2013/0282630 | A1 | 10/2013 | Attenberg et al. |
| 2013/0311997 | A1 * | 11/2013 | Gruber ................... G06Q 10/10 718/102 |
| 2013/0346066 | A1 | 12/2013 | Deoras et al. |
| 2014/0006027 | A1 * | 1/2014 | Kim ........................ G10L 15/22 704/246 |
| 2014/0164317 | A1 * | 6/2014 | Lynch .................... G06Q 10/02 707/609 |
| 2014/0207442 | A1 * | 7/2014 | Ganong, III .......... H04W 12/02 704/201 |
| 2014/0244254 | A1 | 8/2014 | Ju et al. |
| 2014/0244712 | A1 | 8/2014 | Walters et al. |
| 2014/0250378 | A1 | 9/2014 | Stifelman et al. |
| 2014/0297348 | A1 | 10/2014 | Ellis |
| 2014/0310001 | A1 | 10/2014 | Kalns et al. |
| 2014/0330554 | A1 | 11/2014 | Williams |
| 2014/0379326 | A1 | 12/2014 | Sarikaya et al. |
| 2014/0379353 | A1 | 12/2014 | Boies et al. |
| 2015/0032441 | A1 | 1/2015 | Marcus |
| 2015/0051910 | A1 | 2/2015 | Lavallee |
| 2015/0095033 | A1 | 4/2015 | Boies et al. |
| 2015/0149177 | A1 | 5/2015 | Kalns et al. |
| 2015/0169285 | A1 | 6/2015 | Reyes et al. |
| 2015/0179168 | A1 | 6/2015 | Hakkani-Tur et al. |
| 2015/0286747 | A1 | 10/2015 | Anastasakos et al. |
| 2016/0098988 | A1 | 4/2016 | Goussard et al. |
| 2016/0335138 | A1 | 11/2016 | Surti et al. |
| 2016/0378549 | A1 | 12/2016 | Irish |
| 2017/0178626 | A1 | 6/2017 | Gruber et al. |
| 2017/0235465 | A1 | 8/2017 | Marin et al. |
| 2018/0005629 | A1 | 1/2018 | Crook |

FOREIGN PATENT DOCUMENTS

| | | |
|---|---|---|
| WO | 2013150526 A1 | 10/2013 |
| WO | 2014/204655 | 12/2014 |

OTHER PUBLICATIONS

Bohus, et al., "Multiparty Turn Taking in Situated Dialog: Study, Lessons, and Directions", In Proceedings of 12th Annual Meeting of the Special Interest Group on Discourse and Dialogue, Jun. 17, 2011, 12 pages.

Hochberg, et al., "A Flexible Framework for Developing Mixed-Initiative Dialog Systems", In Proceedings of the 3rd SIGdial workshop on Discourse and dialogue, vol. 2, Jul. 2002, 4 pages.

PCT international Search Report in PCT/US2016/041826, dated Sep. 29, 2016, 10 pages.

Yorke-Smith N. et al., "The Design of a Proactive Personal Agent for Task Management", International Journal on Artificial Intelligence Tools (Architectures, Languages, Algorithms) World Scientific Publishing Co. PTE. LTD., Singapore, vol. 21, No. 1, Feb. 2012, 30 pages.

PCT International Search Report and Written Opinion in International Application PCT/US2017/039348, dated Mar. 26, 2017, 20 pages.

PCT 2nd Written Opinion in International Application PCT/US2016/041826, dated Sep. 27, 2017, 6 pages.

U.S. Appl. No. 15/198,285, Office Action dated Jul. 21, 2017, 38 pages.

"Final Office Action Issued in U.S. Appl. No. 15/198,285", dated Jan. 18, 2018, 50 Pages.

"Non Final Office Action Issued in U.S. Appl. No. 15/198,285", dated May 24, 2018, 64 Pages.

PCT International Search Report in International Application PCT/US2017/016318, dated May 12, 2017, 15 pages.

PCT 2nd Written Opinion in International Application PCT/US2016/041826, dated Jun. 14, 2017, 5 pages.

"Non Final Office Action Issued in U.S. Appl. No. 15/043,317", dated Oct. 30, 2018, 14 pages.

"Final Office Action Issued in U.S. Appl. No. 15/198,285", dated Dec. 5, 2018, 71 Pages.

"Final Office Action Issued in U.S Appl. No. 15/043,317", dated Feb. 26, 2019, 14 Pages.

"Non Final Office Action Issued in U.S. Appl. No. 15/198,285", dated Apr. 22, 2019, 53 Pages.

* cited by examiner

400

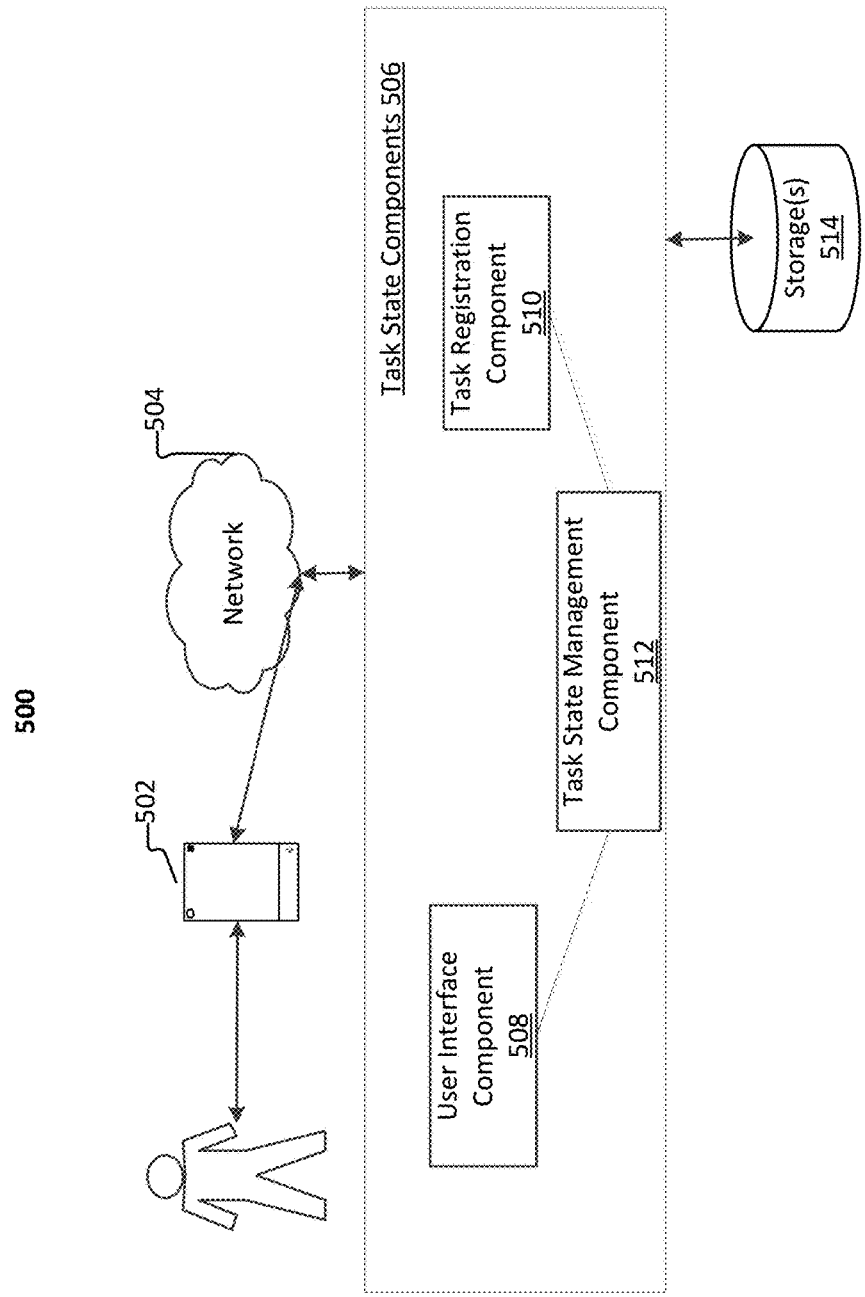

TASK STATE TRACKING IN SYSTEMS AND SERVICES

BACKGROUND

Input understanding systems and services help users perform different tasks (whether executing an action or providing the correct information) by conducting a conversation with the user in which multiple turns are involved. However, the conversation does not necessarily traverse a fixed set of states. To fulfill any task, an input understanding system/service needs various pieces of information that may be elicited from the user. Collection of such information should be executed in a way that: 1) is efficient for the user; and 2) does not burden an executor of a task with task state tracking details. It is with respect to this general technical environment that the present application is directed.

SUMMARY

Non-limiting examples of the present disclosure describe decoupling task state tracking that is managed by a shared task state platform from execution of tasks by a task resource owner. Task registration data is received at a shared task completion platform for a task that is executable by a task owner resource. Task registration data comprises parameters to be collected for execution of the task. During interaction with a user, the shared task completion platform receives an input and determines the task is associated with the received input. During the interaction, parameters of the received task registration data are utilized to collect data for execution of the task. The collected data is transmitted to the task owner resource for execution of the task.

In other non-limiting examples, task state data is managed, for example, during an interaction between a user and a shared task state platform. Task registration data that is received from a task owner resource is stored in a shared task state platform. The task registration data is associated with a task that is executable by the task owner resource. Task registration data comprises parameters to be collected for execution of the task. During interaction with a user, the shared task state platform receives an input and determines the task is associated with the received input. During the interaction, parameters of the received task registration data are utilized to determine whether mandatory parameter data is collected. Mandatory parameter data is data that is necessary for execution of the task. In response to collecting the mandatory parameter data, a request is transmitted from the shared task state platform to the task owner resource. The transmitted request comprises the collected mandatory data and any collected optional data. In some examples, a task state tracker is generated by the shared task state platform. The task state tracker tracks collection of at least the mandatory parameter data during the interaction with the user. A response action may be generated based on a status of the interaction task state tracker, where the status is determined based on collection of the mandatory parameter data. The response action is generated to collect missing mandatory parameter data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 5 illustrates an exemplary system implementable on one or more computing devices on which aspects of the present disclosure may be practiced.

DETAILED DESCRIPTION

Figure 1:
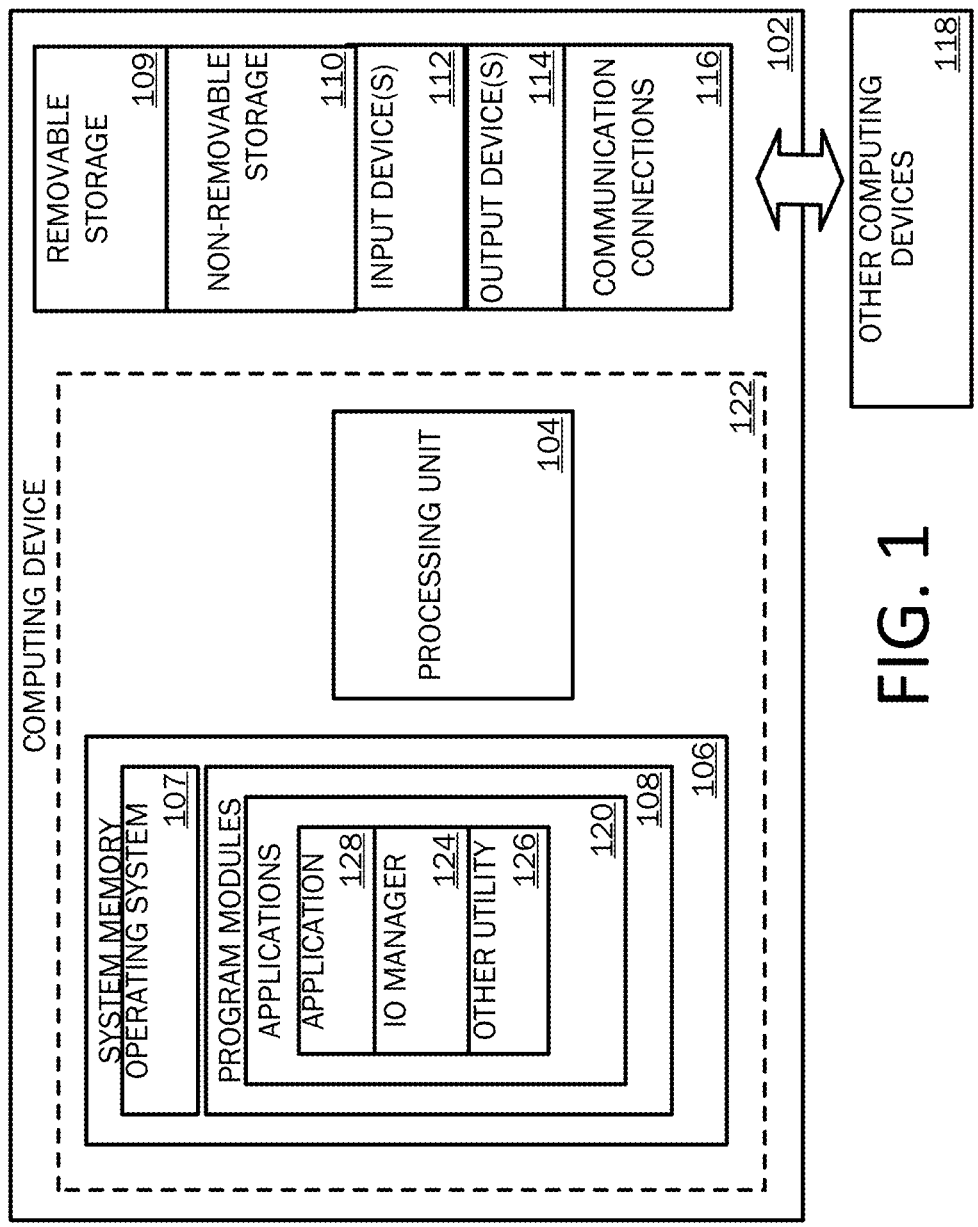
FIG. 1 is a block diagram illustrating an example of a computing device with which aspects of the present disclosure may be practiced.

Input understanding systems/services are based on the idea of seeking information from a user (through voice/text/touch/gaze/gesture) regarding the task they are interested in and then executing that task when the required information has been received. This process involves tracking the state of the task across various steps such as identifying the information needed to complete the task, eliciting this information by prompting the user, confirming the values as understood by the system, disambiguating between various choices, as well as allowing the user to correct the mistaken understanding of the system. During a user interaction, the input understanding systems/services need to keep track of which pieces of information have already been provided and which ones are missing. In some cases, input understanding systems/services may need to revise the previously collected information because of: 1) a mistake in understanding what the user said (due to a speech recognition error) or typed/touched/gestured/gazed input; 2) a mistake in understanding what the user meant (due to a language/system understanding error); or 3) the user changing his/her mind. In other cases, the input understanding systems/services may need to present various valid choices to a user and require the user to select a particular choice and then resume the conversation from thereon. Another possible state in the conversation can include abruptly cancelling the task because i) the user is no longer interested in it, or ii) the system incorrectly inferred that the user is interested in this task. Finally, the system may need to confirm its understanding of various pieces of information it has collected or the various default values it is using for a task and then continue the conversation based on the user's response.

The present disclosure describes examples through which the specification of the task can be decoupled from the process of task state tracking. The state tracking process may be implemented through a shared module (whether on client or service) that is independent of each individual task experience. A task is required to be described through its own specification, and a shared task state platform or shared task completion platform may drive the flow of the interaction/conversation with a user to complete the task after reading in the task specification. In examples, execution of the task may be ultimately performed by a task owner resource that is agnostic to the shared task state platform/shared task completion platform. Among other benefits, task owner resources not only do not need to worry about tracking common conversational states such as confirmation, clarification, disambiguation, revision, rejection, and cancellation but they also do not need to design conversational flows about what the system needs to prompt in response to various responses from the user. The task owners are then only responsible for specifying their tasks in terms of what pieces of information, called parameters, are required to execute a task.

Accordingly, the present disclosure provides a plurality of technical effects including but not limited to: improved efficiency and accuracy in managing a task state during an interaction with a user, analyzing and managing task states in a domain-independent fashion to deploy new task experiences using various input modalities, improved processing and usability for input understanding systems/services, reduction of processing load for input understanding systems/services, scalability of a shared task state platform/task completion platform, streamlining of processing over distributed network systems/services, improved interaction between a shared task state platform/task completion platform and a plurality of task owner resources, reduction in programming burden for task owners that are responsible for task execution including, control over user interaction for input understanding processing, among other examples.

Figure 2A:
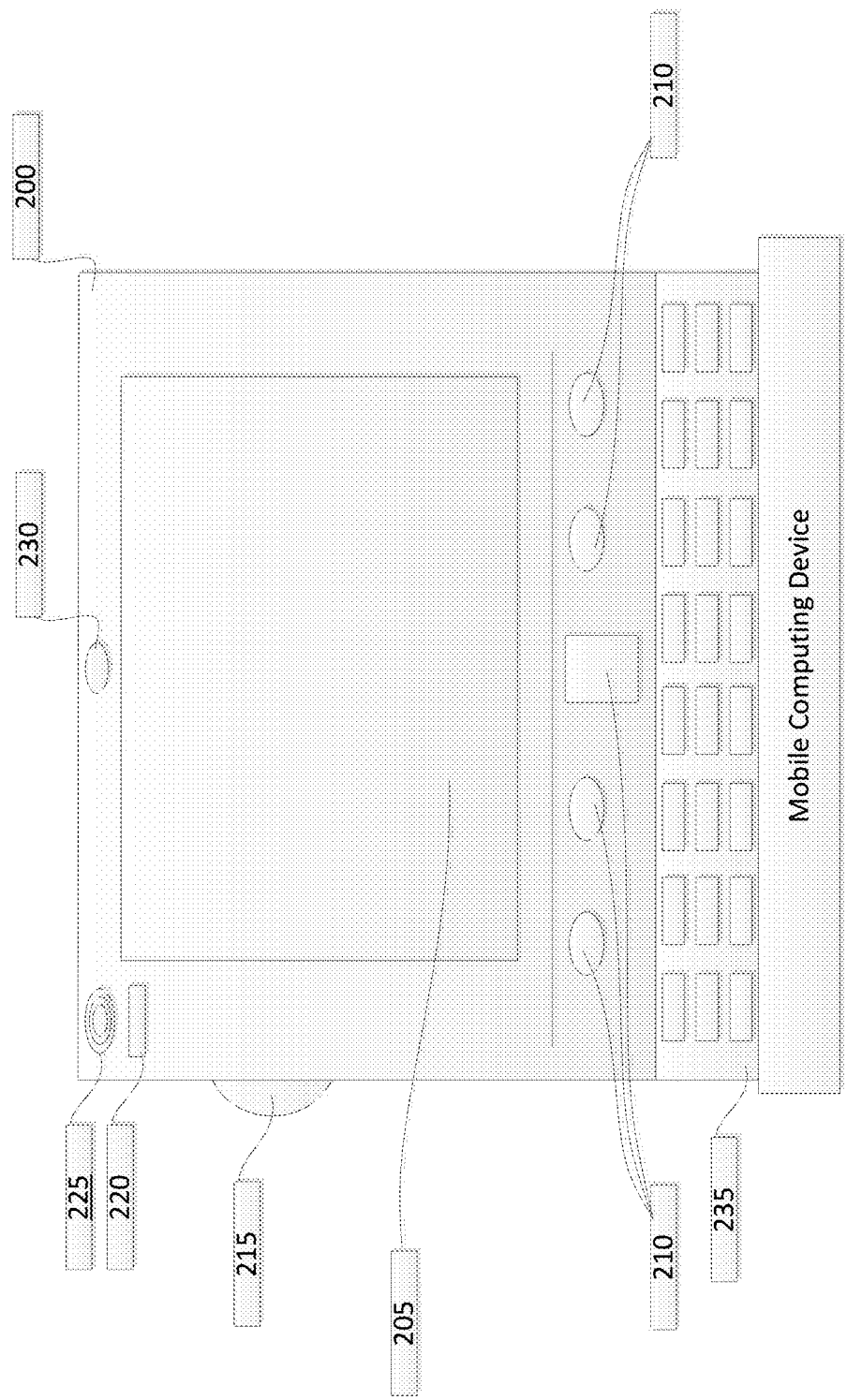
FIGS. 2A and 2B are simplified block diagrams of a mobile computing device with which aspects of the present disclosure may be practiced.
Figure 2B:
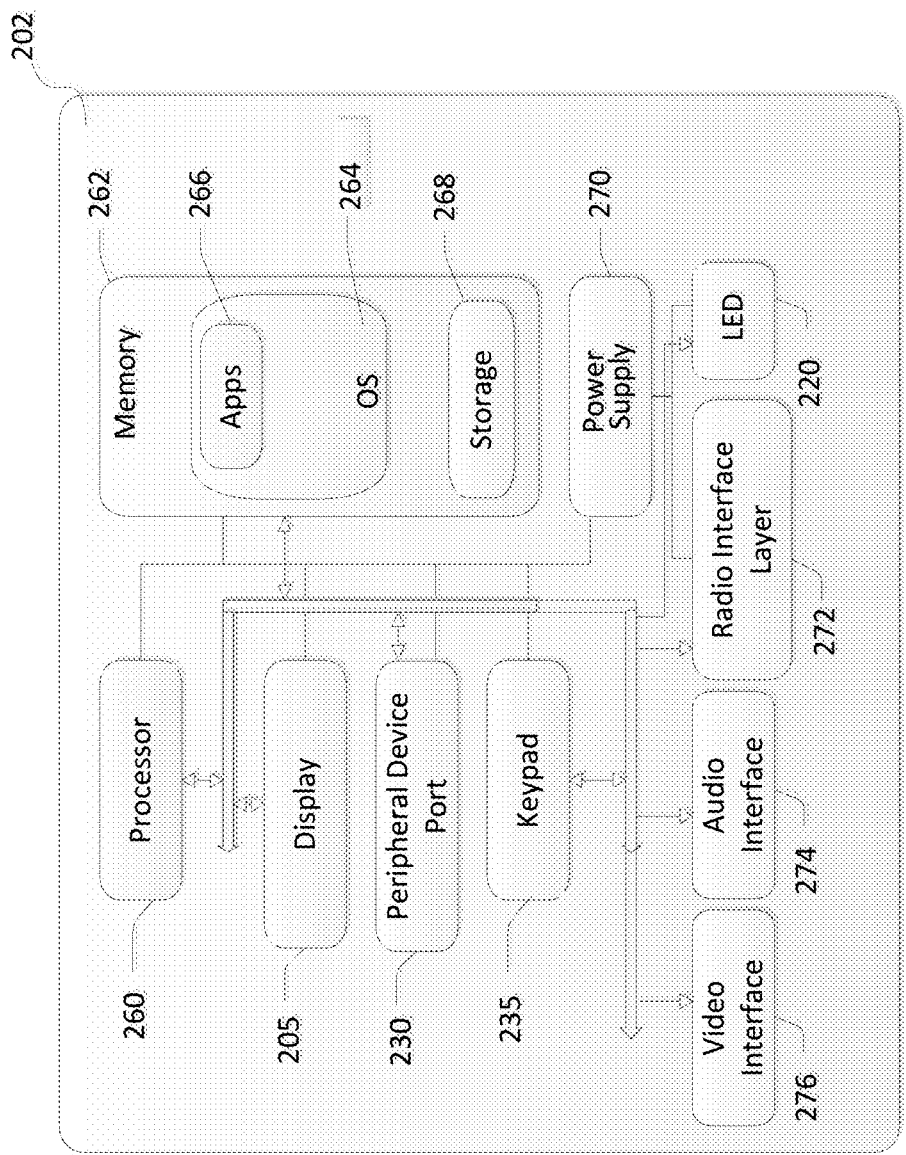
Figure 3:
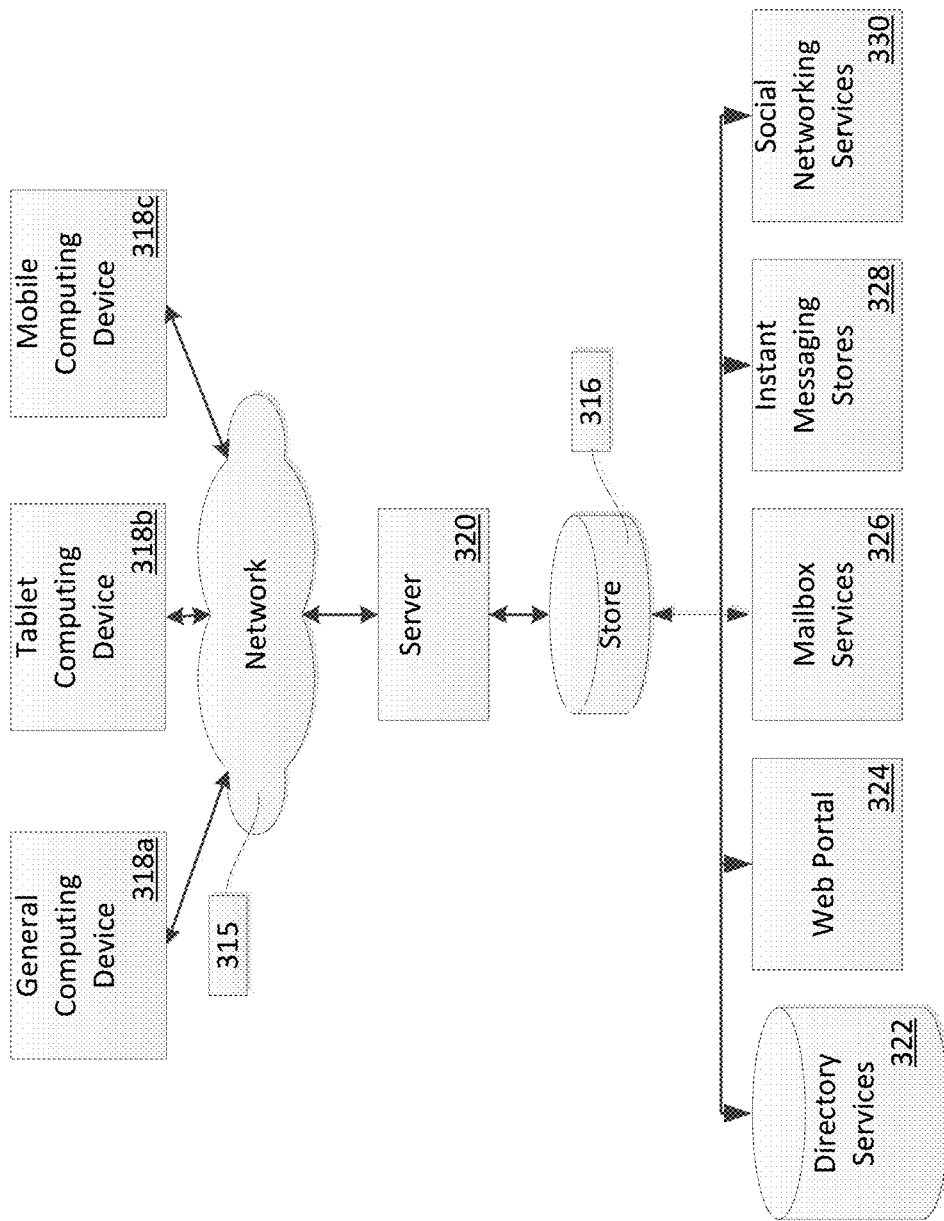
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. For example, mobile computing device 200 may be implemented to execute applications and/or application command control. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

Figure 4A:
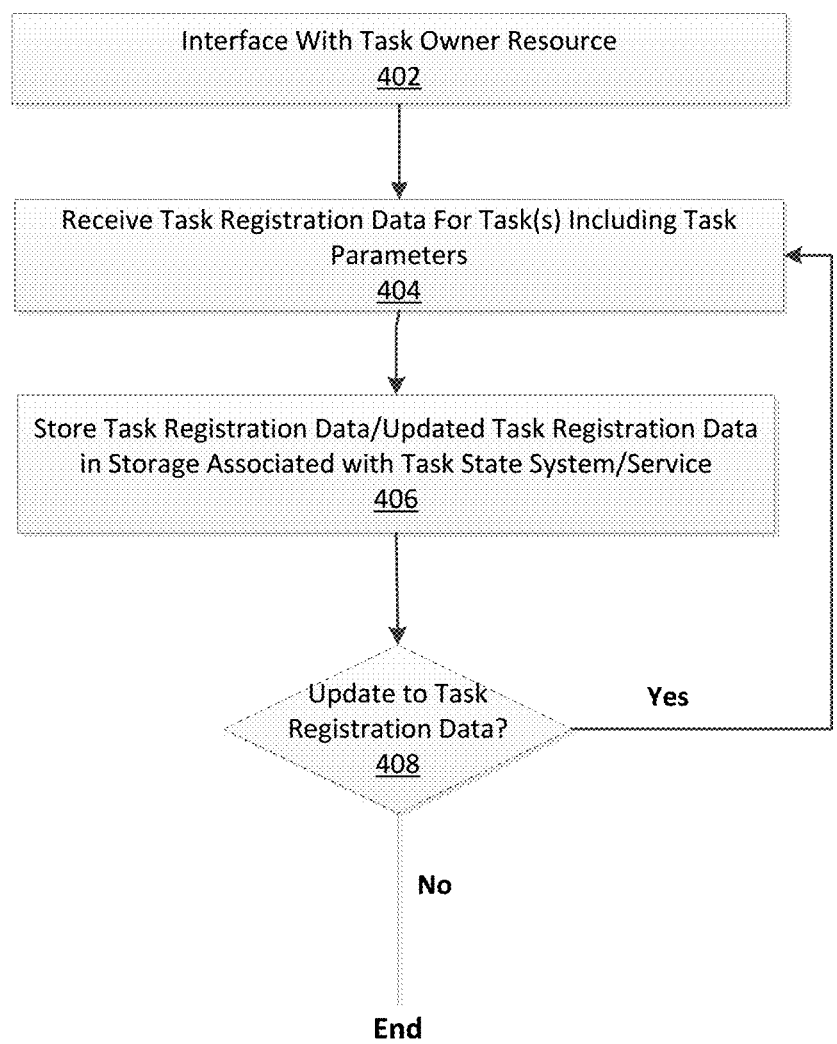
FIG. 4A is an exemplary method for task definition and registration with which aspects of the present disclosure may be practiced.

FIG. 4A is an exemplary method 400 for task definition and registration with which aspects of the present disclosure may be practiced. As an example, method 400 may be executed by an exemplary system such as shown in FIGS. 1-3. In examples, method 400 may be executed on a device comprising at least one processor configured to store and execute operations, programs or instructions. However, method 400 is not limited to such examples. In at least one example, method 400 may be executed (e.g., computer-implemented operations) by one or more components of a distributed network, for instance, web service/distributed network service (e.g. cloud service). In examples, operations performed in method 400 may correspond to operations executed by a system and/or service that execute computer programs, application programming interfaces (APIs), or machine-learning processing, among other examples.

Method 400 begins at operation 402, where a shared task state platform (or shared task completion platform) may interface with a task owner resource. The shared task state platform (or shared task completion platform) is one or more components executing operations to manage a task execution state. In one example the shared task state platform may be components or modules of a larger system/service. In examples, the shared task state platform may interface with a plurality of task owner resources (external to the task state platform) to enable registration of tasks and parameters associated with such tasks that are needed for completion. The task state platform also manages a flow of interaction with a user that may not require a task owner to manage a task state associated with a specified task. Given the task registration data (such as the task specification), the task-agnostic shared task state platform is responsible for determining the current state of the task and driving the conversation with the user based on this state. In examples, the task states are agnostic to the actual task under execution and the shared task state platform can focus on maintaining information about the task parameters, i.e., what information (if any) has been collected from the user regarding these parameters. In examples, the shared task state platform gathers data that may be needed to complete the task, and can provide such data to the task owner resource to enable execution and completion of a task associated with a received input.

A task owner is a party responsible for execution of a task. That is, a task owner implements functionality for task execution of one or more tasks. In examples, task owners may be one or more persons managing task execution. In other examples, task owners are teams of persons within one or more organization that manage exemplary system/services. In some examples, task owners can be third-party services that may interface with an exemplary shared task state platform to enable execution of tasks. Examples of the present disclosure benefit task owners because task owners do not have to dictate or define interaction/conversation flow with user. Instead, task owners can concern themselves with the execution of the task; a task owner can just define what parameters are needed to execute the task and enable the shared task state platform to manage an interaction with a user. Functionality that is provided by exemplary shared task state platforms may share data with different task owners for completion of different tasks. If a task is being implemented, a task owner does not need to concern itself with meta-actions for gathering data from a user during an interaction such as a conversation. Designer does not need to worry about flow and ordering related to data gathering. Underlying generic process/flow by an exemplary system/service can be applied to a specific task that is to be executed by a task owner resource.

A task owner resource is any resource (e.g., system component, application, service, etc.) that is used to execute a task/action. A task owner resource is associated with a task owner that may execute a task. A task owner resource includes but is not limited to first party, second party, and third-party systems and/or application/services. Design and description associated with the present disclosure is applicable to all types of task experiences such as native first-party clients that provide the task capabilities on a given platform, second-party clients that are implemented by the same organization which is providing the task agnostic state tracking capability or third party clients that are implemented by some other organization which is different from the organization responsible for providing the task agnostic state tracker. Examples of first party and second party task owner resources include any application or service including but not limited to web search services, communication services such as e-mail applications, calendars, device management services, address book services, informational services, etc. Third party resources may comprise any system, application services and/or websites that are hosted or controlled by third parties including but not limited to services previously mentioned above, line-of-business (LOB) management services, customer relationship management (CRM) services, debugging services, accounting services, payroll services, etc. Task owner resources may further include other websites and/or applications such as social media websites; photo sharing websites; video and music streaming websites; search engine websites; sports, news or entertainment websites, and the like. Task owner resources may provide robust reporting, analytics, data compilation and/or storage service, etc., access to additional resources such as search engines or other access to data and information, images, videos, and the like.

For instance, the shared task state platform may be components/services associated within an application/service such as an intelligent personal assistant, among other examples. An intelligent personal assistant is a mobile software agent that can perform tasks, or services, for an individual based on user input, location awareness, and the ability to access information from a variety of online sources. Examples of intelligent personal assistants include but are not limited to SILVIA, S-Voice, Voice Mate, Google Now, Cortana, Hidi and Siri, among other examples. In one example, the shared task state platform may be a component or operations within an intelligent personal assistant. In that example, the intelligent personal assistant may interface with task owner resources that are native to the intelligent personal assistant system/service (e.g., first party task owner resources) to execute a task. In another example, the shared task state platform may interface with task owner resources that are managed by a same organization (e.g., second party task owner resources) as the task owner platform. For instance, the intelligent personal assistant may communication with other applications or services to execute a task such as an example where data is passed to an email application to generate an email message based on a received input. In yet another example, the shared task state platform may interface with resources that are external to an organization associated with the task state platform. In some examples, the shared task state platform may interface with third-party resources to transmit data that enables the task owner to create, edit or execute a task. While examples of an intelligent personal assistant are described, one skilled in the art will recognize that services or operations performed by the shared task state platform are able to interface with any type of system and/or service example.

In operation 402, the shared task state platform may interface with one or more task owner resources. Operation 402 defines the interaction between task owner resources and the shared task state platform as part of the process of defining a task. As an example, application agents of the shared task state platform may interface with task owner resources using webhooks to facilitate open-ended communication. In other examples, application programming interfaces (APIs) may enable interaction between the shared task state platform and task owner resources. In some examples, the shared task state platform may interface with task owner resources in a distributed network environment. In other examples, the shared task state platform and a task owner resource may be operating on the same processing device. Operation 402 may comprise transmission of requests and responses, for example between components operating on a processing device or over a network connection.

Flow may proceed to operation 404 where task registration data is received from a task owner resource. As described in examples above, application agents of the shared task state platform may be used to interface with task owner resources using webhooks in order to facilitate integration. In other examples, APIs may enable interaction and register task registration data. Task registration data is any data associated with a task to be executed by a task resource owner. As an example, task registration data may comprise a task specification that defines a task. For instance, task specification comprises parameters to be collected for execution of a task and definitions of such parameters and other data to supplement manage of task state/task completion. As an example, a task specification may comprise language generation prompt data that may be used for collection of parameter data from user. Additionally, a task specification may comprise data that may be used to set configurations for using (or not using) confirmations during collection of parameter data as well as task completion.

Mandatory parameter data is parameter data that the task owner resource requires for execution of the task. For instance, consider the example where a task is to send a communication message such as a text message/SMS message. The task specification provided by the task owner may specify that the shared task state platform should obtain data such as who the intended recipient of the message is before being able to send the message.

Optional parameter data is parameter data that the task owner might like to have (for sake of completeness) but may not require for execution of the task or may be supplemental information that a user may wish to provide for task execution. For instance, continuing the above example, the task specification related to sending a text message may consider the content/body of the message as optional. That is, a task owner resource associated with a messaging application may generate a text message draft without the body of the message completed. In another example, a user may intend to make a restaurant reservation and in the data provided may clarify that a party of the user may desire to sit near the bar of the restaurant. One skilled in the art will recognize that the present disclosure is not limited to such parameter examples. Parameters can be defined by the task owner or the shared task state platform where the shared task state platform can utilize such information to determine how to manage the conversational flow when interacting with a user. Optional parameter data may be provided in the task specification and utilized at the discretion of the shared task state platform. For instance, the shared task state platform may evaluate a state/status of the interaction (e.g., conversational flow) and determine whether or not to obtain optional parameter data.

In examples, a task owner may define parameters associated with a task as well as provide other information to guide a policy for collecting task parameters such as what data be explicitly confirmed, what can be implicitly inferred by a system/service, etc. However, in other examples, the shared task state platform may receive data from a task owner resource and generate task registration data for managing an interaction with a user. In examples, operation 404 may comprise one or more request/responses transmitted between the task owner and shared task state platform. In one example, task registration data registered for one or more parameters of the task specification may comprise data such as:

1) Name of parameter,
2) A mapping to the slot tags provided by an input understanding component/module to that corresponds with a parameter, where a slot tag is a classification or categorization of data (e.g., entity data) associated with a received input,
3) A Boolean value indicating whether the parameter is a mandatory or optional parameter,
4) Type of the parameter which can include a data type that gets resolved into a back-end entity (such as a person in an address book, or a business name in a database), a data type with some validation (date/time, phone number, set of known strings) or a free-form field which can contain some text or numerical value, among other examples,
5) An optional source from which the parameter can be resolved such as a list provided at run-time (e.g., user's personal address book, or list of favorite places), or a static well-known resource (database of businesses, or dictionary of city names) available to the system, or contact some other web service (e.g., a service that provides the appointments on a user's calendar at any given time), and
6) Optional value indicating the priority of this parameter relative to other parameters of the same task so that the shared task state platform can identify which parameter of the task specification are to be prompted first.

In addition to specifying the task parameters, basic information about the task may be specified in a task specification. Basic information about the task may include but is not limited to: name of the task, a mapping of any signals from earlier stages of processing generated from received/incoming inputs and identification of a task, and possible combinations of filled parameter values that correspond to complete information needed to execute the task. The present disclosure enables complex parameter specification where the task specification can require conjunction, disjunction or some combination of conjunction and disjunction of user specified entities to consider whether a parameter value has been completely provided (e.g., for a particular parameter it may require that one of a person or a time comprising date and time values separately or a location has to be provided).

Flow proceeds to operation 406 where registration data is stored in a storage associated with the shared task state platform. The shared task state platform may maintain task registration data to enable the shared task state platform to manage an interaction with a user and collect data on behalf of the task owner resource that may ultimately execute a task. In one example a storage is storage 514 described in system 500 shown in FIG. 5. Storage is any technology consisting of computer components and recording media used to retain digital data. Examples of storage comprise but are not limited to memory, memory cells, data stores, and virtual memory, among other examples. In other examples, a location of an exemplary storage may be on a client device (e.g., client-side).

In examples, method 400 may comprise decision operation 408 where it is determined whether an update to the task registration data is received at the shared task state platform. As an example, update to the task registration data may be received from a task owner/task owner resource. For instance, a task specification (e.g. task definition file) such as parameters or other data (e.g., language generation prompts) may be updated by a task owner/task owner resource where any data associated with an exemplary task specification may be changed or updated. In one example, parameters associated with a task specification may be changed or updated. In an alternative example, the shared task state platform may be configured to update a task specification. If no update to the registration data is received, flow branches NO and processing of method 400 ends. However, if an update to the registration data is received, flow branches YES and flow returns to operation 404 where updated task registration data is received. Updated task registration data may be utilized upon detection of input that calls for a task associated with the task registration data.

Figure 4B:
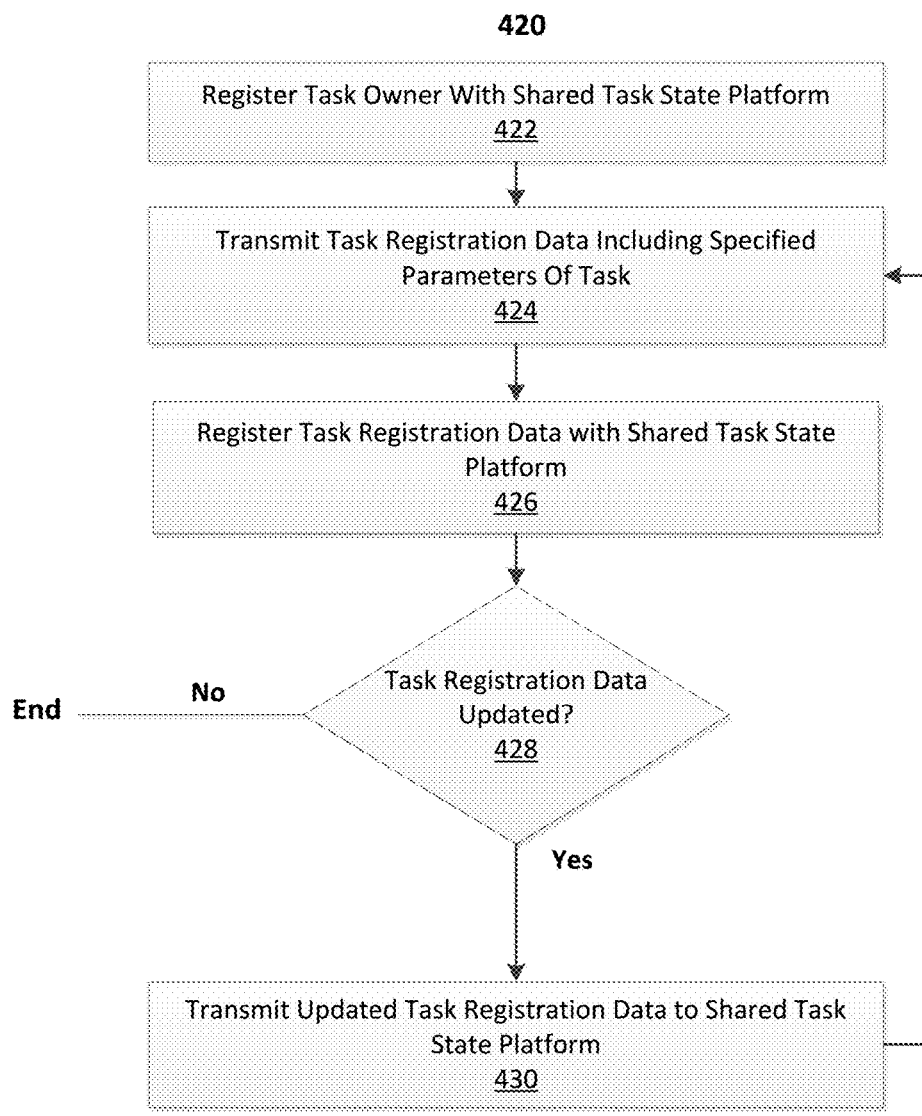
FIG. 4B is an exemplary method for task definition and registration with which aspects of the present disclosure may be practiced.

FIG. 4B is an exemplary method 420 for task definition and registration with which aspects of the present disclosure may be practiced. As an example, method 420 may be executed by an exemplary system such as shown in FIGS. 1-3. In examples, method 420 may be executed on a device comprising at least one processor configured to store and execute operations, programs or instructions. However, method 420 is not limited to such examples. In at least one example, method 420 may be executed (e.g., computer-implemented operations) by one or more components of a distributed network, for instance, web service/distributed network service (e.g. cloud service). In examples, operations performed in method 420 may correspond to operations executed by a system and/or service that execute computer programs, application programming interfaces (APIs), or machine-learning processing, among other examples.

Flow of method 420 begins at operation 422 where the task owner registers with the shared task state platform. Descriptions of a task owner, task owner resource, shared task state platform, and task registration data, are described above in the description of FIG. 4A. As described in examples above, a task owner may communicate with a shared task state platform through application agents using webhooks in order to facilitate integration and/or communication channels for the task owner. In other examples, APIs may enable interaction between a task owner and the shared task state platform to enable transmission of task registration data. Examples of task registration data are provided above in the description of method 400 (FIG. 4A).

Flow proceeds to operation 424 where a task owner transmits task registration data to the shared task state platform. Examples of task registration data (e.g., task specification) including parameters associated with task registration data are described above with respect to the description of method 400 of FIG. 4A. In examples, operation 424 may comprise one or more request/responses transmitted between the task owner and shared task state platform.

Flow then proceeds to operation 426 where task registration data is registered with the shared task state platform. In examples, the task owner/task owner resource may interface with shared task state platform, through webhooks, APIs, and any other type of requests/responses such as (HTTP requests, JSON requests, etc.) to enable registration of task registration data with the shared task state platform.

Flow may proceed to decision operation 428, where it is determined whether task owner/task owner resource determines to update the task registration data. For example, the task owner/task owner resource may update the parameters or other data associated with a task specification/task registration data. If the task registration data is to be updated, flow branches YES and proceeds to operation 430 where the updated registration data is transmitted to the shared task state platform. Flow then returns to operation 424 where the updated task registration data is transmitted, for example, to the shared task state platform. If the task registration data is not updated, flow branches NO and processing of method 420 ends.

Figure 4C:
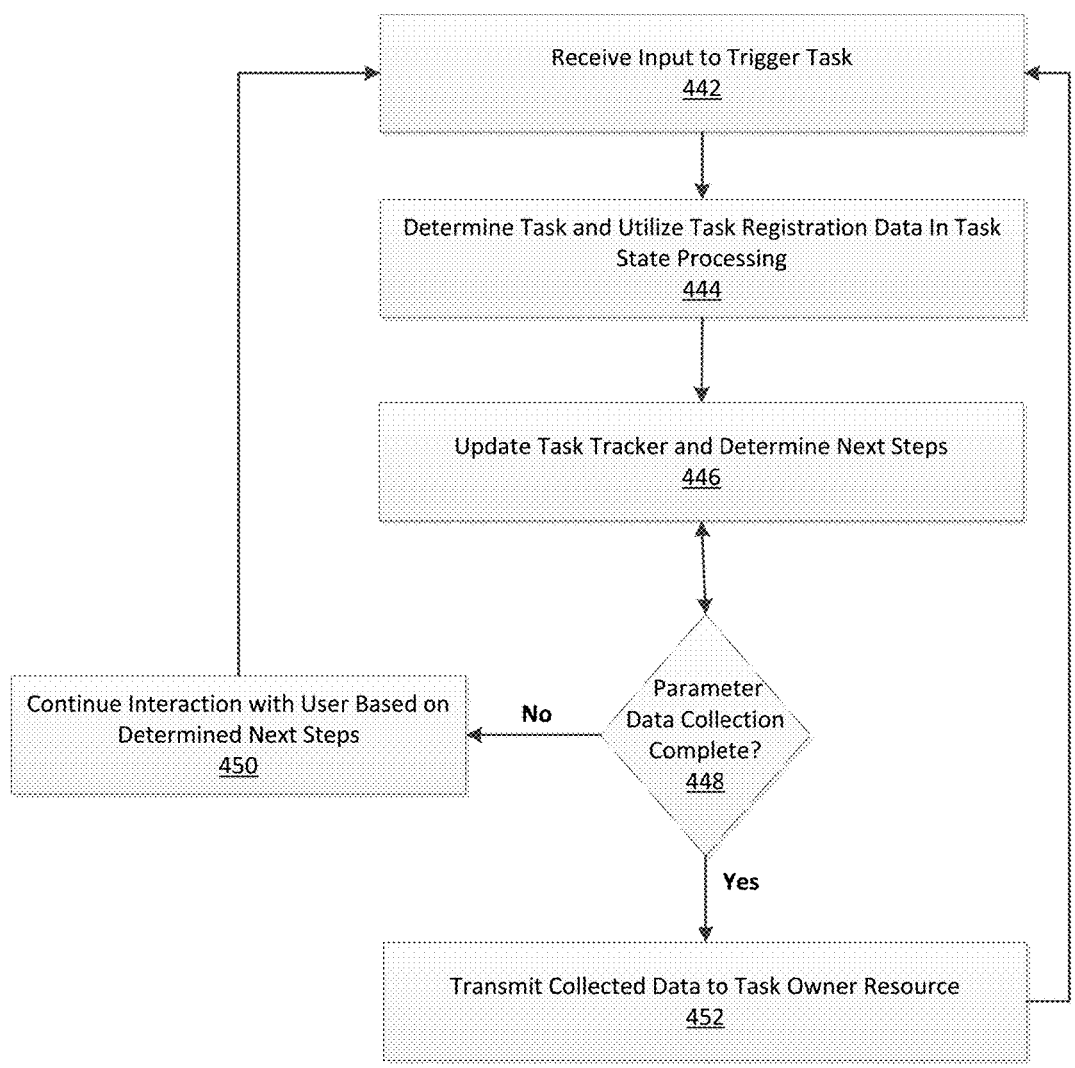
FIG. 4C is an exemplary method for task execution with which aspects of the present disclosure may be practiced.

FIG. 4C is an exemplary method for task execution with which aspects of the present disclosure may be practiced. As an example, method 440 may be executed by an exemplary system such as shown in FIGS. 1-3. In examples, method 440 may be executed on a device comprising at least one processor configured to store and execute operations, programs or instructions. However, method 440 is not limited to such examples. In at least one example, method 440 may be executed (e.g., computer-implemented operations) by one or more components of a distributed network, for instance, web service/distributed network service (e.g. cloud service). In examples, operations performed in method 440 may correspond to operations executed by a system and/or service that execute computer programs, application programming interfaces (APIs), or machine-learning processing, among other examples.

Method 440 begins at operation 442 where an input is received that may trigger potential task execution. In an example, input is received from an end user having an intention for system/services to execute a task on behalf of the user. In example, input may be in any form including but not limited to: text, speech, touch data, audio/voice, handwritten entry, etc. In evaluating a received input for a corresponding task, operation 442 may comprise detection receipt of an input (or multiple inputs).

Flow may proceed to operation 444, where a task is determined from a received input. The shared task state platform may utilize input understanding processing components to identify domains and tagged data (e.g., slots and/or entities) from a received input. A task may be determined based on evaluating stored task registration data. The shared task state platform may utilize stored task registration data for a plurality of tasks to identify one or more tasks that associate with the received input. In examples, machine learning processing operations, APIs or other programming algorithms may be applied to determine and rank a potential task options. In examples, processing operations may determine a task that is most likely to correspond to a user's current intent. In other examples, task determination processing may also facilitate switching between tasks (with or without confirmation from a user) should a user's intent change or be misrecognized by a system/service. In some examples, the shared task state platform may be unsure of what task matches a user's intention. In that case, the shared task state platform may control interaction with the user to take further action such as confirm/remove a task option and/or disambiguate between potential task options, among other examples. In examples, the shared task state platform may utilize stored task registration data to manage task state processing including operations to determine a task associated with a received input.

Once a task is determined, flow proceeds to operation 446 where a task state tracker may be updated (or created and updated) to manage a task state based on received input. A task state tracker is a collection of data in any form (e.g., file, index, checklist, spreadsheet, image, etc.) that can be used to assist a shared task state platform in managing task registration data associated with tasks. In example, a task state tracker may comprise a collection of data associated with one or more determined tasks. For instance, a shared task state platform may create, manage and archive a task state tracker for an interaction that corresponds to a determined task. The task state tracker may be used to manage interaction including follow-up and continued communication with a user, for example, to obtain data necessary for task completion and collect such data in the best way possible. In examples, the task state tracker may manage data collected from previous interaction with a user in order to direct future interaction with the user. A status associated with a task state tracker may be updated based on interaction between a user and the shared task state platform. In examples, the task state tracker may be created based on task registration data associated with a determined task. For instance, the task state tracker may be a collection of programming operations that can interact evaluate task registration data and provide status updates to manage interaction with a user throughout an interaction with a user.

Operation 446 may further comprise determining next steps/actions associated with processing a received input. In doing so, the shared task state platform may identify and reference the stored task registration data associated with a determined task. In examples, machine learning processing operations, APIs or other programming algorithms may be utilized to identify stored registration data associated with the determined task and extract parameter data to manage task state interaction with a user as well as manage a task state tracker associated with task state management.

In examples of method 440, flow may proceed to decision operation 448 where it is determined whether parameter data collection is complete. In examples, decision operation 448 may comprise evaluating the task state tracker to determine whether at least necessary mandatory parameter data has been collected from the user. If mandatory parameter data (e.g., values satisfying the mandatory parameters specified in the task registration data) is not collected for each of the mandatory parameters, flow branches NO and proceeds to operation 450. In operation 450, the shared task state platform may determine how to continue interaction with the user based on evaluation of the task state tracker. In that example, the shared task state platform manages (operation 450) the interaction with the user to obtain parameter data and/or other data from the user in a most efficient way possible. In one example, the shared task state platform may output a response to a received input that may be a request for additional information, clarification or confirmation of an interpretation of user intent, among other examples. In that example, flow may return back to operation 442 where additional input may be received that is associated with task state processing. As an example, a shared task state platform may determine a cost associated with requesting additional data, confirming data, disambiguating data, etc. In one instance, a cost associated with requesting certain data may be high (e.g., high likelihood that the interaction might negatively impact a user experience) and make a decision not to request/confirm optional parameter data. At other points in the interaction, the shared task state platform may determine that the cost associated with requesting additional requests is low (e.g., low likelihood that the burden of requesting additional data might negatively impact a user experience). In that instance, the shared task state platform may make a decision to request values for data such as optional parameter data. In some cases, the task specification or task definition file may provide information that is useful in assisting the shared task state platform in making decisions about how to handle interaction with a user including how to structure system responses. Management of further interaction with a user after an initial received input is described in greater detail in the description of FIG. 6, for example.

If parameter data collection is complete, flow branches YES and proceeds to operation 452 where the collected parameter data is transmitted to the task owner resource. The task owner can utilize the transmitted data to execute the task for the user. In examples, the task owner resource determined whether a task execution request is received. As an example, the shared task state platform may send a request that includes collected data (e.g., values/completed parameter data) that is received by the task resource owner. The task resource owner can use such data to execute a task. In examples, flow of method 440 may be continuous where a system/service associated with the shared task state platform may continuously monitor for received input and process the received input accordingly. As shown in FIG. 440, flow may return back to operation 442 in response to receipt of further input.

FIG. 5 illustrates an exemplary system 500 implemented on a computing device for command line interaction, according to examples described herein. Exemplary system 500 presented is a combination of interdependent components that interact to form an integrated whole for learned program generation based on user example operations. Components of system 500 may be hardware components or software implemented on and/or executed by hardware components of system 500. In examples, system 500 may include any of hardware components (e.g., ASIC, other devices used to execute/run operating system (OS)), and software components (e.g., applications, application programming interfaces, modules, virtual machines, runtime libraries, etc.) running on hardware. In one example, an exemplary system 500 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 500 may vary and may include more or fewer components than those described in FIG. 5. In some examples, interfacing between components of the system 500 may occur remotely, for example where components of system 500 may be spread across one or more devices of a distributed network. In examples, one or more data stores/storages or other memory are associated with system 100. For example, a component of system 500 may have one or more data storages/memories/stores associated therewith. Data associated with a component of system 500 may be stored thereon as well as processing operations/instructions executed by a component of system 500. System 500 comprises a processing device 502, a network connection 504, task state components 506 and storage(s) 514. The task state components 506 may comprise one or more additional components such as user interface component 508, task registration component 510 and task state management component 512. Task state components 506 may be components/modules associated with a shared task state platform described previously in the description of FIG. 4A, for example.

Processing device 502 may be any device comprising at least one processor and at least one memory/storage. Examples of processing device 502 may include but are not limited to: mobile devices such as phones, tablets, phablets, slates, laptops, watches, computing devices including desktop computers, servers, etc. In one example processing device 502 may be a device of a user that is running an application/service associated with the shared task state platform (described in FIGS. 4A and 4B). In examples, processing device 502 may communicate with task state components 506 via a network 504. In one aspect, network 504 is a distributed computing network, such as the Internet.

The task state components 506 are a collection of components that are used for managing interaction with task owners/task owner resources and also managing an interaction/conversational flow with a user. As identified above, task state components 506 may be components/modules associated with a shared task state platform described previously in the description of FIG. 4A, for example. Task state components 506 comprise a user interface component 508. The user interface component 508 is one or more components that are configured to enable interaction with a user of an application or service associated with the shared task state platform. Transparency and organization are brought to users of such an application/service through the user interface component 508 where a user can interact with the shared task state platform to assist in obtaining data that is used during execution of a task. The task registration component 510 and the task state management component 512 may interface with the user interface component 508. In one example, the user interface component 508 is implemented on processing device 502 to facilitate user interaction. However, one skilled in the art will recognize that any processing device can be configured to perform specific operations of the user interface component 508. In some aspects, the user interface component 508 may send/receive information and commands via a client processing device to a server device (e.g., distributed system) for processing. In examples of system 500, the user interface component 508 may interface with at least one storage 514 to enable display and processing of a user interface (UI) associated with an application/service implementing the shared task state platform.

The task registration component 510 is a component that manages interaction with task owners/task owner resources. Example operations performed by the task registration component 510 comprise operations related to interfacing with task owners/task owner resources, registration of task registration data, and providing collected data to task owner resources for execution of tasks. Refer to the description of method 400 (FIGS. 4A and 4B) for further description related to an interaction between a shared task state platform and a task owner/task owner resource. In examples of system 500, the task registration component 510 may interface with at least one storage 514 to enable processing associated with an application/service implementing the shared task state platform.

The task state management component 512 is a component that manages interaction/conversational flow with a user of an application/service associated with the task state components 506 (e.g., shared task state platform). Example operations performed by the task state management component 512 comprise operations related to receiving and processing input, determining a task associated with a received input, evaluating task registration data associated with a determined task, and collecting/managing data needed for execution of the task. Refer to the description of method 400 (FIG. 4A) for further description related to managing a state of interaction with a user. In examples, the task state management component 512 can determine tasks associated with a received input, and utilize task registration data (such as a task specification for the task) to collect data that a task owner/task owner resource can utilize to execute the determined task. The task-agnostic shared task state platform, for example via the task state management component 512, is responsible for determining the current state of the task and driving the conversation with the user based on this state. In examples, the task states are agnostic to the actual task under execution and the shared task state platform can focus on maintaining information about the task parameters, i.e., what information (if any) has been collected from the user regarding these parameters. In examples of system 500, the task state management component 512 may interface with at least one storage 514 to enable processing associated with an application/service implementing the shared task state platform.

Figure 6:
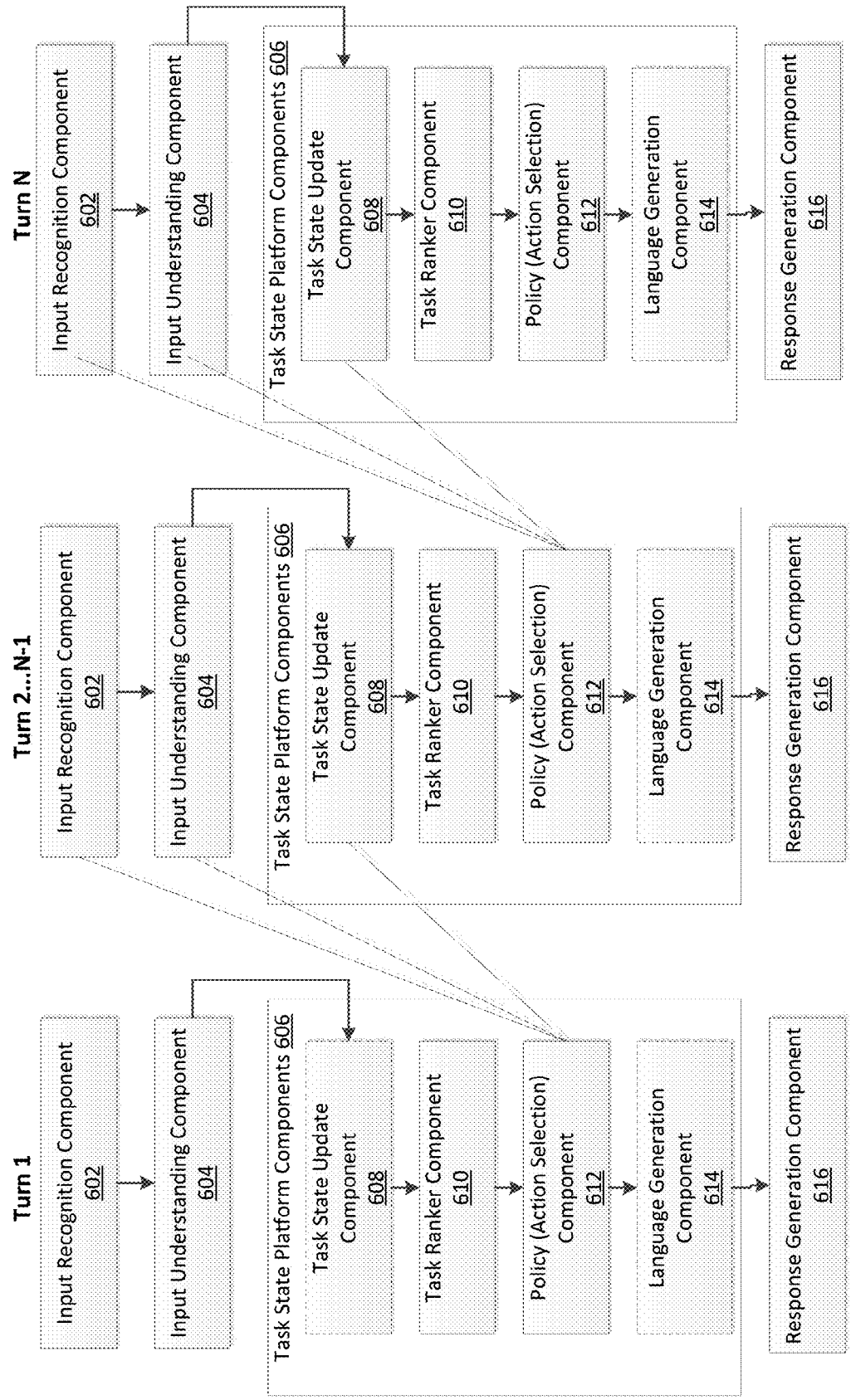
FIG. 6 illustrates an exemplary system implementable on one or more computing devices on which aspects of the present disclosure may be practiced.

FIG. 6 illustrates an exemplary system 600 implementable on one or more computing devices, according to examples described herein. As one example, system 600 may be a more specific example of system 500 described in FIG. 5. Exemplary system 600 presented is a combination of interdependent components that interact to form an integrated whole for learned program generation based on user example operations. Components of system 600 may be hardware components or software implemented on and/or executed by hardware components of system 600. In examples, system 400 may include any of hardware components (e.g., ASIC, other devices used to execute/run operating system (OS)), and software components (e.g., applications, application programming interfaces, modules, virtual machines, runtime libraries, etc.) running on hardware. In one example, an exemplary system 400 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 600 may vary and may include more or fewer components than those described in FIG. 6. In some examples, interfacing between components of the system 600 may occur remotely, for example where components of system 400 may be spread across one or more devices of a distributed network. In examples, one or more data stores/storages or other memory are associated with system 600. For example, a component of system 600 may have one or more data storages/memories/stores associated therewith. Data associated with a component of system 600 may be stored thereon as well as processing operations/instructions executed by a component of system 600. Components of the system 600 may interface with an OS of a processing device to allow input understanding and processing. For example, the system 600 may be configured to receive input from a user and process the received input to manage user interaction. Aspects related to enabling entry of input and receiving the input for processing are well known in the field of use and are not described in the present disclosure. In one example, system 600 may be an input understanding system such as a conversational understanding (CU) system. However, the system 600 possesses processing means and may be configured to handle any type of input including but not limited to speech/voice input, text input, gesture input, handwritten input, among other examples. In one example, the system 600 may operate as an intelligent personal assistant. However, one skilled in the art will recognize that input understanding processing examples are not limited to application in an intelligent personal assistant. Exemplary system 600 comprises an input recognition component 602, input understanding component 604, task state platform components 606, and a response generation component 616, where each of the identified components may comprise one or more additional components as shown in FIG. 6. In examples, the task state platform components 606 may comprise a task state update component 608, a task ranker component 610, a policy component 612, and a language generation component 614.

Furthermore, in examples, components of system 600 may utilize knowledge data in processing by any of the components of system 600. Knowledge data is any data that is usable by a component of system 600 to improve processing of received inputs, and management of a flow of interaction with a user. In examples, knowledge data may be maintained by data stores (not shown) associated with system 600. However, in other examples, each component of system 600 may comprise stores/memories for managing knowledge data particular to a processing component.

The input recognition component 602 is a component that receives, processes and translates a received input for recognition. When an input is received by system 600, the input is transmitted to the input recognition component 602 for processing. The input recognition component 602 may interface with a user interface of system 600 to initiate processing of a received input (e.g., refer to the description of FIG. 5 including the user interface component 508). As examples described above, inputs processed by the input recognition component 602 include but are not limited to speech/voice input (e.g., utterances), text input, gesture input and handwritten input, among other examples.

The input recognition component 602 is configured to process the received input into a form that is able to be understood by components of system 600. As an example, spoken queries may be processed into text. In example, input recognition component 602 may implement automatic speech recognition (ASR), computer speech recognition, or speech to text (STT), among other examples, to process speech to text for evaluation/additional processing by system 400. In examples, the input recognition component 602 may process the received input and generate an NBest list of results for transcribing the received input. In another example, the input recognition component 602 may process the received input by producing a word confusion network (WCN) and/or lattice which can then be used to generate results for the received input. Like other components of system 600, the input recognition component 602 may retain as well as propagate alternative results of the received input instead of settling on a single choice for output. Alternatives generated by the input recognition component 602 may be propagated to be further evaluated. In examples, machine learning processing operations, APIs or other programming algorithms including programming operations that associate with knowledge data may be utilized by the input recognition component 602 to recognize a received input.

In examples, the input recognition component 602 can also be used to evaluate generated results. In examples, a ranker component can be associated with the input recognition component 602 and may be used to rank a plurality of results generated by the input recognition component 602. In one example, generated results may be ranked based on a determined likelihood of how likely the system 600 believes it is interpreting a received input. However, a component may analyze and evaluate generated results of a processing component in any manner that enables the component to distinguish response options/alternatives from one another. In examples, a confidence value may be associated with each of the generated results. Comparison of results may include statistical modeling and/or ranking of results whereby metrics may be applied to rank the generated results of the input recognition component 602. In some examples, a list (e.g., one or more alternatives/interpretations of received input) may be pruned before being propagated for subsequent processing by a downstream component of system 600. For instance, the input recognition component 602 may interface with the input understanding component 604 of system 600 to intelligently propagate a number of ranked results for further processing. In doing so, system 600 can make sure components of system 600 are processing effectively and efficiently. As an example, the number of results propagated to subsequent processing component may be determined using a threshold evaluation based on latency and/or capacity constraints and/or other transmitted signal data associated with one or more components of system 600.

Once an input is recognized by the input recognition component 602, results may be transmitted to and evaluated by the input understanding component 604. Input understanding component 604 analyzes context associated with propagated results to evaluate a context associated with a processed received input. As an example, the input understanding component 604 may be natural language understanding (NLU) component, a spoken language understanding (SLU) component, gesture recognition/understanding component, and/or affect/emotion/facial expression understanding component. However, one skilled in the art will recognize that operations of the input understanding component 604 are not limited to examples such as NLUs and SLUs. The input understanding component 604 may evaluate, contextual data associated with a result of a received input, for example, evaluating a domain, intent, and entities associated with a received input. In examples, the input understanding component 604 may produce a triplet containing a domain, an intent, and tagged slots (e.g., classification of extracted entities), and can utilize information from the triplet to determine a task associated with a received input. In exemplary input understanding processing, each of the domain, intent and entity can be evaluated individually. However, in alternative examples, input understanding processing can be streamlined to generate one or more sets of alternatives from the combination of data included in the triplet.

In examples, machine learning processing operations, APIs or other programming algorithms including programming operations that associate with knowledge data may be utilized by the input understanding component 604 to evaluate context of a received input. The input understanding component 604 may detect a domain associated with a received input. A domain refers to a logical grouping for intent of a received input. For instance, results propagated from the input recognition components 602 may be associated with one or more applications/services that can be used to satisfy intent of a received input. As an example, consider a received input of "Schedule a meeting with Paul." The input understanding component 604 may evaluate that input and determine that a domain such as a calendar application (or email application) may be used to execute the task of scheduling an email with a contact named "Paul". A task may be determined (by the task ranker component 610 of the task state components 606) based on evaluation of the domain of the received input. See description of the task ranker component 610. In association, the input understanding component 604 may evaluate an intent associated with the received input. Where the domain of the example above may be a calendar application, the intent of the received input may be determined as schedule a calendar entry for a meeting with a contact named "Paul." A contact named "Paul" may be identified as an entity associated with the received input.

In examples, the input understanding component 604 can be used to evaluate generated results. In examples, a ranker component may be associated with the input understanding component 604 and the ranker may be used to rank a plurality of results generated by the input understanding component 604. In one example, generated results may be ranked based on a determined likelihood of how likely the system 600 believes that an evaluation matches intent of the user. However, a component may analyze and evaluate generated results of a processing component in any manner that enables the component to distinguish response options/alternatives from one another. In examples, a confidence value may be associated with each of the generated results. Comparison of results may include statistical modeling and/or ranking of results whereby metrics may be applied to rank the generated results of the input understanding component 604. In some examples, a list (e.g., one or more alternatives/interpretations of received input) may be pruned before being propagated for subsequent processing by a downstream component of system 600. For instance, the input understanding component 604 may interface with the task state platform components 606 of system 600 to intelligently propagate a number of ranked results for further processing. In doing so, system 600 can make sure components of system 600 are processing effectively and efficiently. As an example, the number of results propagated to subsequent processing component may be determined using a threshold evaluation based on latency and/or capacity constraints associated with one or more components of system 600.

Results from the input understanding component 604 may be received at the task state platform components 606. The task state platform components 606 are a set of components that can determine a current state of the task identified by the input understanding component 604 and drive an interaction with a user based on a determined task state. The task state platform components 606 comprise a task state update component 608, a task ranker component 610, a policy component 612 and a language generation component 614.

The task state update component 608 is a component that is used to evaluate a state of a determined task and provide data to additional components of the task state platform components 606 to manage a flow of interaction with a user. As an example, the task state update component 608 may be associated with data identified or extracted from task registration data of a determined task. In one example, the task state update component 608 is utilized to determine what data for a determined task has been obtained from received input and what data system 600 may still need to request from a user. The task state update component 608 may interact with other components of system 600 such as the policy component 612 in determining whether all necessary data is collected regarding a determined task. The task state update component 608 may be used to evaluate a received input and determine if at least one of additional data and/or confirmation of an understanding by system 600 is to be requested from a user. This may occur after a first received input or subsequent received input. In one example, the task state component 608 may be utilized during an interaction with a user where there is at multiple turns of interaction with a user. For instance, a user may make a request to execute a task. System 600 may determine a task associated with the request, and identify that additional data is to be requested from the user in order to provide a task owner resource with the data needed to execute the task. In that case, system 600 may identify that further interaction with a user is to occur in order to obtain the additional data from the user. During a subsequent turn of interaction with a user, the task state update component 608 may be utilized to determine if system 600 collected the requested data as well as if further data is to be requested for the user.

In examples, the task state update component 608 may manage data collection during a user interaction by maintaining a task state tracker. As identified above, a task state tracker is a collection of data in any form (e.g., file, index, checklist, spreadsheet, image, etc.) that can be used to assist a shared task state platform (e.g., system 600) in managing task registration data associated with tasks. Examples of assisting may include but are not limited to conditioning the behavior of various models/components of the shared task state platform. In examples, a task state tracker may comprise a collection of data associated with one or more determined tasks. For instance, system 600 may create, manage and archive a task state tracker for an interaction that corresponds to a determined task. The task state update component 608 may retain data (e.g., task state tracker) from previous interaction with a user. A status associated with a task state tracker may be updated based on interaction between a user and system 600. In examples, the task state tracker may be created based on task registration data associated with a determined task. In other examples, the task state tracker may be a collection of programming operations that can interact evaluate task registration data and provide status updates to one or more components of system 600 to manage interaction with a user. As identified above, the task state update component 608 may provide a status of the task state tracker to the policy component 612 to assist the policy component 612 in determining a next action during an interaction with a user. In examples, the state tracker may track any data relates to a task specification (e.g., task definition) such as parameter data (e.g., mandatory parameter data and optional parameter data) as well as other data including but not limited to conversation events (e.g., number of questions repeated, number of failed attempts, language generation prompts, etc.).

The task ranker component 610 is a component that may be utilized to analyze a received input and determine a task from a plurality of possible actions/tasks. As an example, the task ranker component 610 analyzes processing received from one or more other components of system 600 (e.g., input understanding component 604 and task state update component 608) and determines a relevant task. The task ranker component 610 may be utilized to evaluate relevance of a task at any point during an interaction with a user. For instance, the task ranker component 610 may evaluate a first received input and determine a task that is associated with the received input. In response to subsequent input being received, the task ranker component 610 may evaluate whether the initially determined task is still relevant to the interaction with the user or if the interaction/conversation is directing system 600 towards selection of a different task. In examples, the task ranker component 610 may evaluate data such as domain and entity/slot data provided by the input understanding component 604, and utilize such data in determining potential tasks that may be associated with a received input. One or more potential task options may be identified based on processing performed by the task ranker component 610.

In examples, the task ranker component 610 can be used to evaluate potential task options. A ranker component may be associated with the task ranker component 610 and the ranker may be ranked according to likelihood that a task option matches intention of a received input. However, a component may analyze and evaluate task options in any manner that enables the task ranker component 610 to distinguish task options from one another. In examples, a confidence value may be associated with each task option. Comparison of results may include statistical modeling and/or ranking of results whereby metrics may be applied to rank the generated results of the task ranker component 610. One or more potential task options may be selected for output. In some examples, the system may have a high confidence level in two or more potential task options. Based on processing performed by components of system 600, it may be determined that an output should be generated to disambiguate between tasks options. In another example, the system 600 may identify a highest ranked task option and may request confirmation from the user that a determined task is what the user intended including an example where system 600 switches between alternate tasks. Once a determined task is identified, the task ranker component 610 may pass a determined task to the policy component 612 for additional task state processing. In examples, where an interaction between a user and system 600 is continued (e.g., subsequent input is received), the task ranker component 610 may be utilized to validate that a determined task is still relevant to the interaction with the user. Processing identified above regarding ranking of potential task options may be executed to determine a task based on received input from the user. In any example, the task state update component 608 may retain data (e.g., task state tracker) from previous interaction with a user to intelligently build off of prior received input.

The policy component 612 is a component utilized to evaluate a next action of system 600 in response to a received input. As described above, the policy component 612 may interface with task state component 608 to receive data relevant to a determined task including whether mandatory parameter data is collected. In one example, a status update from a task state tracker is provided to the policy component 612. In other examples, the policy component 612 may directly access task registration data to determine what data may still be needed from a user for a determined task. Additionally, the policy component 612 can utilize output from other additional components to determine how system 600 should direct an interaction with a user. Furthermore, a policy component 612, like other components of system 600, may interact with resources external to system 600 in order to enhance processing capabilities by the policy component 612. For example, the policy component 612 may utilize knowledge data to better evaluate potential response options to a received input.

In examples, the policy component 612 can be used to evaluate potential response options. A ranker component may be associated with the policy component 612 and the ranker may be ranked according to a confidence level in a next action. However, the policy component 612 may analyze and evaluate response options in any manner that enables the policy component 612 to distinguish potential response options. In examples, a confidence value may be associated with response options. Comparison of results may include statistical modeling and/or ranking of results whereby metrics may be applied to rank the generated results of the policy component 612. One or more potential actions may be selected for output. In some examples, the system may have a high confidence level in two or more potential next actions. Based on processing performed by components of system 600, it may be determined that an output should be generated to disambiguate between tasks options. In another example, the system 600 may identify a highest ranked response option and may request confirmation from the user. Once a response option is identified, the policy component 612 may pass output to a subsequent component of system 600 for additional task state processing. For instance, data may be transmitted to a language generation component 614 in response to determining that system 600 is requesting additional action from a user. In another example, the policy component 612 may transmit data directly to the response generation component 616 in response to determining that data is to be transmitted to a task owner/task owner resource for execution of a task. In any example, the policy component 612 may retain data from previous interaction with a user to intelligently build off of prior received input.

The language generation component 614 is a component of system 600 that is utilized to generate a prompt for communication with a user. As identified above, examples of system 600 may not require operations from the language generation component 614 in all cases. In examples, where system 600 is requesting additional action from a user, the language generation component 614 may be utilized to determine how system 600 is to communicate with a user. In examples, the language generation component 614 may utilize the data received from the policy component 612 to determine how to phrase a communication to the user depending on the action determined by the policy component 612, for example, where actions may include but are not limited to: confirmation, clarification, disambiguation, revision, rejection, and cancellation, among other examples. In examples, system 600 retains data from interaction with a user in order to identify a best possible way of communication with a user. In some examples, the language generation component may perform operations to generate a plurality of phrasing options and utilize a ranker component to select a best phrasing option. Like other components of system 600, the language generation component 614 may utilize knowledge data to improve processing in determining how to best phrase a response to a user.

The response generation component 616 is a component of system 600 that may be utilized to formulate a response to a received input and manage output to one of a user or a task owner resource. In examples, the response generation component 616 can utilize output from other components of system 600 to generate a response for output to a user. The response generation component 616 may determine a form of presenting a system response (e.g., text to speech, text to display, etc.) and output a response to a user. In examples where the policy component 612 determines that a next action is to transmit collected data to a task owner/task owner resource, the response generation component 616 may interface with a task owner resource to enable the task owner resource to execute a task on behalf of the user.

Examples of the disclosure are not restricted by how a system and/or service chooses which task experience is invoked in the first (or subsequent) turn. Processing examples associated with choosing a task may include but are not limited to: requiring the explicit utterance of certain words, processing based on rule-based policy, modeling such as statistical machine-learning based approach to rank various tasks and choose a top ranked task, maintaining a full distribution over multiple tasks and updating the state for each task separately with a ranker determining which task is chosen at the end, among other examples.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-readable memory device including computer executable instructions that, when executed by at least one processor, causes the at least one processor to perform a method for decoupling task state tracking from an execution of a task, comprising:
   receiving, at a task-agnostic shared task completion platform, task registration data for a plurality of tasks from a plurality of task owner resources, wherein each task in the plurality of tasks is executable by a particular task owner resource and wherein the task registration data for each task in the plurality of tasks comprises at least one mandatory parameter that is necessary to be collected for execution of each task in the plurality of tasks;
   storing, in a storage device associated with the task-agnostic shared task completion platform, the task registration data for the plurality of tasks;
   receiving an input from a user of the task-agnostic shared task completion platform;

determining, based at least in part, on the received input and the task registration data for the plurality of tasks, whether the received input is associated with at least one task in the plurality of tasks;

when it is determined that the received input is associated with the at least one task, updating, by the task-agnostic shared task completion platform, a task state tracker that manages the state of the at least one task based, at least in part, on the received input and determines a subsequent action associated with processing the received input;

determining whether the at least one mandatory parameter for the at least one task has been collected; and when it is determined that the at least one mandatory parameter has been collected, transmitting, over a communication network, the at least one mandatory parameter data to a particular task owner resource for execution of the at least one task.

2. The computer-readable memory device of claim 1, further comprising instructions for generating a response that comprises a request for the mandatory parameter data based on the task registration data.

3. The computer-readable memory device of claim 1, further comprising instructions for generating a prompt using at least one parameter.

4. The computer-readable memory device of claim 3, wherein the prompt is provided to the user to solicit additional information about the at least one task.

5. The computer-readable memory device of claim 1, wherein the task registration data also comprises optional parameter data.

6. The computer-readable memory device of claim 5, further comprising transmitting the optional parameter data over the communication network to the particular task owner resource when it is determined that the optional parameter data has been collected.

7. A system for decoupling task state tracking from an execution of a task, comprising:
   at least one processor; and
   a memory coupled to the at least one processor and storing instructions that, when executed by the at least one processor, perform a method, comprising:
   receiving, at a task-agnostic shared task completion platform, task registration data for a plurality of tasks from a plurality of task owner resources, wherein each task in the plurality of tasks is executable by a particular task owner resource and wherein the task registration data for each task in the plurality of tasks comprises at least one mandatory parameter that is necessary to be collected for execution of each task in the plurality of tasks;
   storing, in a storage device associated with a task-agnostic shared task state platform, the task registration data for the plurality of tasks
   receiving an input to the task-agnostic shared task state platform;
   determining, based at least in part, on the received input and the task registration data from the plurality of tasks, whether the received input is associated with at least one task in the plurality of tasks;
   when it is determined that the received input is associated with the at least one task, updating, by the task-agnostic shared task completion platform, a task state tracker that manages the state of the at least one task based, at least in part, on the received input and determines a subsequent action associated with processing the received input;
   determining whether the at least one mandatory parameter for the at least one task has been collected; and
   when it is determined that the at least one mandatory parameter has been collected, transmitting a request over a network, that comprises the at least one mandatory parameter data to a particular task owner resource for execution of the at least one task.

8. The system of claim 7, wherein the task registration data also comprises optional parameter data.

9. The system of claim 8, further comprising instructions for generating the task state tracker by the task-agnostic shared task state platform, wherein the task state tracker tracks collection of data associated with the at least one task that comprises at least one of the mandatory parameter data and the optional parameter data.

10. The system of claim 9, further comprising instructions for generating a response action based, at least in part, on a status of the task state tracker, wherein the status is determined based on collection of parameter data.

11. The system of claim 10, wherein the generated response action is an output that comprises at least one of: disambiguating multiple values associated with a parameter of the task registration data, confirming a value associated with the parameters, requesting receipt of at least one portion of the mandatory parameter data, and cancelling the task.

12. The system of claim 8, further comprising instructions for determining based, at least in part, on received input, whether to obtain the optional parameter data.

13. The system of claim 7, further comprising instructions for:
   retaining data associated with processing of the received input;
   evaluating a state of the determined task based on a received subsequent input; and
   updating the state of the determined task based on application of the retained data and evaluation of the received subsequent input.

14. A computer-implemented method for decoupling task state tracking from an execution of a task, comprising:
   receiving, at a task-agnostic shared task completion platform, task registration data for a plurality of tasks from a plurality of task owner resources, wherein each task in the plurality of tasks is executable by a particular task owner resource and wherein the task registration data for each task in the plurality of tasks comprises at least one mandatory parameter that is necessary to be collected for execution of each task in the plurality of tasks and at least one optional parameter;
   storing, in a storage device associated with the task-agnostic shared task state platform, the task registration data;
   receiving an input from a user of the shared task state platform;
   determining, based at least in part, on the received input and the task registration data, whether the received input is associated with at least one task;
   when it is determined that the received input is associated with the at least one task, updating, by the task-agnostic shared task completion platform, a task state tracker that manages the state of the at least one task based, at least in part, on the received input and determines a subsequent action associated with processing the received input;
   determining whether at least the at least one mandatory parameter for the at least one task has been collected; and when it is determined that at least the at least one mandatory parameter data has been collected, transmitting the at least one mandatory parameter data, over a network, to at least one of the plurality of task owner resources that is determined to be responsible for executing the at least one task.

15. The computer-implemented method of claim 14, further comprising generating the task state tracker by the task-agnostic shared task state platform.

16. The computer-implemented method of claim 14, further comprising generating a response action based on a status of the task state tracker, wherein the status is determined based on collection of parameter data including at least one of the mandatory parameter data and the optional parameter data.

17. The computer-implemented method of claim 16, wherein the generated response action is an output that comprises at least one of:
disambiguating multiple values associated with a parameter of the task registration data, confirming a value associated with the parameters, requesting receipt of at least one portion of the mandatory parameter data, and cancelling the task.

18. The computer-implemented method of claim 14, further comprising:
executing input recognition processing on the received input; and
executing input understanding processing on the received input; and
wherein the determining of the at least one task further comprises:
utilizing results from the input understanding processing to determining potential domains for execution of the task; and
selecting at least one domain for execution of the at least one task.

19. The computer-implemented method of claim 14, further comprising:
retaining data associated with processing of the received input;
evaluating a state of the at least one task based on a received subsequent input; and
updating the state of the at least one task based on application of the retained data and evaluation of the received subsequent input.

20. The computer-implemented method of claim 14, further comprising transmitting the optional parameter data over the network to the at least one of the plurality of task owner resources when it is determined that the optional parameter data has been collected.

\* \* \* \* \*